W. T. MERCER.
PLANT PROTECTOR.
APPLICATION FILED JULY 28, 1917.
1,264,419.
Patented Apr. 30, 1918.
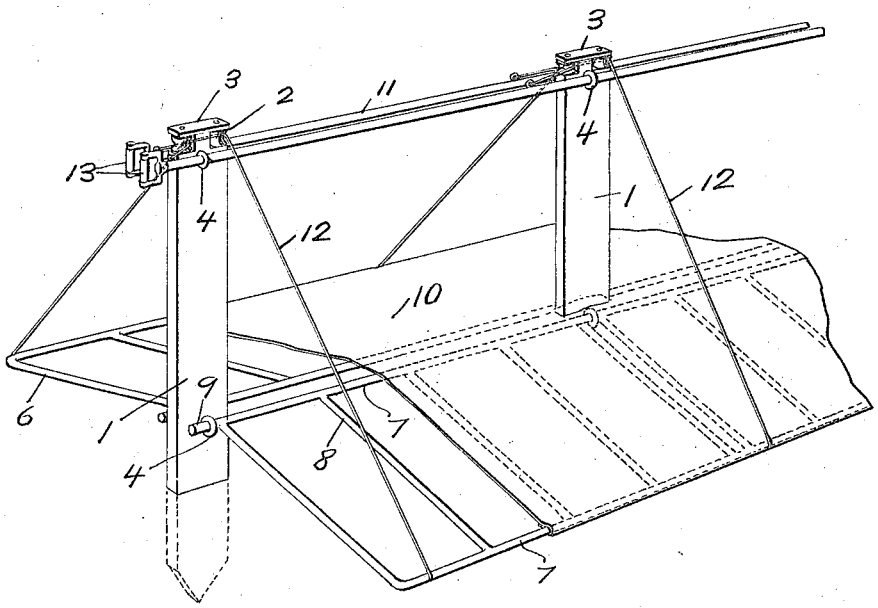
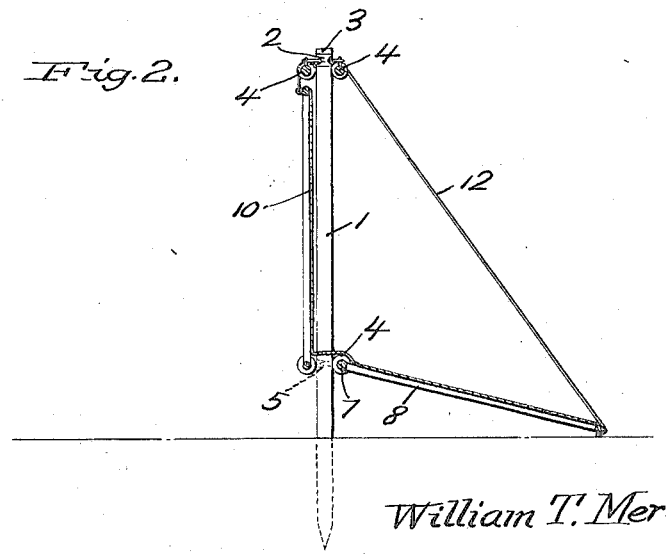
INVENTOR
William T. Mercer,
BY
ATTORNEY
WITNESSES

UNITED STATES PATENT OFFICE.

WILLIAM T. MERCER, OF WILMINGTON, NORTH CAROLINA, ASSIGNOR OF ONE-HALF TO J. D. FARRIOR, OF WILSON, NORTH CAROLINA.

PLANT-PROTECTOR.

1,264,419.　　　　Specification of Letters Patent.　　Patented Apr. 30, 1918.

Application filed July 28, 1917. Serial No. 183,250.

*To all whom it may concern:*

Be it known that I, WILLIAM T. MERCER, a citizen of the United States, residing at Wilmington, in the county of New Hanover and State of North Carolina, have invented certain new and useful Improvements in Plant-Protectors, of which the following is a specification.

This invention relates to plant protectors and contemplates the use of wings which will house plants and protect them from the elements, likewise from animals, birds or the like.

A further object of the invention is to provide a protector embodying wings which are covered with a flexible imperforate material so that the wings will effectively protect the plants and may be folded together when not in use.

In the actual use of the invention it has been found desirable to place the posts of the protector in longitudinal alinement with the plants and to hinge wings on the opposite sides of the posts, the wings being permitted to rest at an inclination so that water or other elements will be shed therefrom. Furthermore, a single canvas sheet completely covers the wings to prevent water from seeping through the protector at the jointure of the wings and to provide an incumbersome and inexpensive structure. Independent operating means is provided for each wing, although if desired the wings may be simultaneously operated. When in a folded position the wings and posts will occupy a minimum amount of space so as to in no way interfere with the implements or machines used in cultivating the plants.

The above and other objects and advantages of this invention will be in part described, and in part understood from the following description of the present preferred embodiment, the same being illustrated in the accompanying drawings, in which Figure 1 is a fragmentary perspective view of a protector constructed in accordance with my invention, Fig. 2 is an end elevational view showing one side of the protector in a folded position.

In the drawings a plurality of posts 1 are provided which are preferably pointed at their lower ends to facilitate planting of the posts in the earth. The posts are also relatively narrow and are equipped in their upper ends with revoluble rollers 2. Upon reference to Fig. 1 of the drawings it will be noted that the upper end of each post has portions of the lateral margins thereof removed so as to provide parallel recesses adapted for the reception of said rollers. A plate 3 is mounted on the upper end of each post and serves as a bearing for each pair of rollers.

A pair of eye bolts 4 are detachably mounted in each side of each of the posts 1, the shanks of the eye bolts being correspondingly formed so as to interfit, thereby reducing possibility of casual displacement, to a minimum. The shanks of said eye bolts preferably interfit as indicated by the dotted lines 5 in Fig. 2, in which male and female shanks are used. The eye bolts at the lower ends of the posts are appreciably spaced from the lower terminals of the latter so that when the posts are planted in the earth, the lower eye bolts of each post will be elevated above the surface level of the earth.

A pair of protective wings are pivotally engaged with said posts, the wings being generally designated 6. Each wing comprises a pair of parallelly arranged rods 7 which are connected by transverse rods 8 as best illustrated in Fig. 1 of the drawings. One of the longitudinally extending rods of each wing has the terminal thereof extended to provide pintles 9 which are rotatably mounted in the lower of the eye bolts 4 on the posts 1. It will of course also be understood that the rod of each wing which is equipped with the pintles 9, extends through the lower of the eye bolts in the intermediate posts. In this way a relatively flat oblong body forms a skeleton for each wing. By having the lower eye bolts of each post elevated from the ground, it will be seen that the outer longitudinal edges of the wings will gravitate into contact with the surface of the earth.

A flexible imperforate covering 10 is arranged over the wings 6, the marginal edges of said covering being turned over the outer longitudinal rods of each wing and secured thereto. The covering is preferably made of canvas, and is provided with openings along its longitudinal center, corresponding to said posts 1.

An operating bar 11 is slidably arranged through the eyelets at the upper end of the posts 1, on each side of the latter, the bars on one side of the posts being in connection, through the medium of cables 12, with the wing which is hinged on the opposite sides of said post. It will be noted that the cables 12 are trained over the rollers 2 in order to facilitate movement of the wings into an open and closed position. Furthermore, the eye bolts snugly engage the bars 11 so as to frictionally hold the latter from movement unless pressure is exerted on the bars. In order to facilitate movement of the bars 11, the terminals of the latter are formed to provide handles 13 which are arranged in very close proximity to each other and may be conveniently grasped by the hands of the operator for simultaneously or independently operating the wings.

It is to be understood that this device may be used in any way in the protection of plants without departing from the scope of my invention. The fact that the protector in its entirety, will be relatively flat when in a folded position, makes the protector especially desirable for use with such plants as are usually cultivated by plows or other large soil cultivating implements.

It will be understood that the above description and accompanying drawings comprehend only the general and preferred embodiment of my invention and that various minor changes in details of construction, proportion and arrangement of parts may be made within the scope of the appended claim without sacrificing any of the advantages of my invention.

I claim:

A plant protector comprising posts, each having a pair of eye bolts secured to each of its opposite sides, protective wings including longitudinally extending rods received in the lower of the said eye bolts, operating rods slidably arranged in the upper eye bolts, the eye bolts for the operating rod snugly engaging the same to frictionally hold the rod against casual displacement, rollers carried by the posts and rotatable in a horizontal plane and above the said rod, and cables attached to the outer marginal edge of each wing and connected to the said rod and passing over the said rollers, the said cables being connected whereby the rod at one side of the device may be actuated to actuate the wing at the opposite side thereof.

In testimony whereof I affix my signature in presence of a witness.

WILLIAM T. MERCER.

Witness:
M. E. JONES.

Copies of this patent may be obtained for five cents each, by addressing the "Commissioner of Patents, Washington, D. C."